F. A. HATFIELD.
VALVE.
APPLICATION FILED APR. 10, 1915.

1,197,288. Patented Sept. 5, 1916.

Witnesses
Edward H. Barkelew.
N. C. Hungston

Inventor
Frank A. Hatfield
by James T. Barkelew
his Attorney.

UNITED STATES PATENT OFFICE.

FRANK A. HATFIELD, OF LOS ANGELES, CALIFORNIA, ASSIGNOR TO F. C. KINGSTON, OF LOS ANGELES, CALIFORNIA.

VALVE.

1,197,288.      Specification of Letters Patent.      Patented Sept. 5, 1916.

Application filed April 10, 1915. Serial No. 20,439.

*To all whom it may concern:*

Be it known that I, FRANK A. HATFIELD, a citizen of Canada, residing at Los Angeles, in the county of Los Angeles, State of California, have invented new and useful Improvements in Valves, of which the following is a specification.

This invention relates to a valve construction, capable of application and use in various combinations and particularly applicable to use as a check valve. In the following specification I explain my invention specifically as a check or outlet valve for an air compressor or the like; but it will be understood that this is only one of the specific purposes to which my valve may be put. The general utility of my valve will be seen from the following specification.

It is an object of this invention to provide a simple and efficient valve combination in which the clearance is reduced to minimum (practically to zero), which can be made so as to form an exceptionally tight joint, and which will not wear in such manner as to deteriorate the tight joint.

It is also an object of the invention to provide a valve in which the moving part is extremely light, and in which the hammering of the valve upon its seat consequently is reduced to a minimum.

These features are all explained in the following specification, reference being had to the accompanying drawings in which I have illustrated the said specific embodiment of my invention, and in which—

Figure 1:
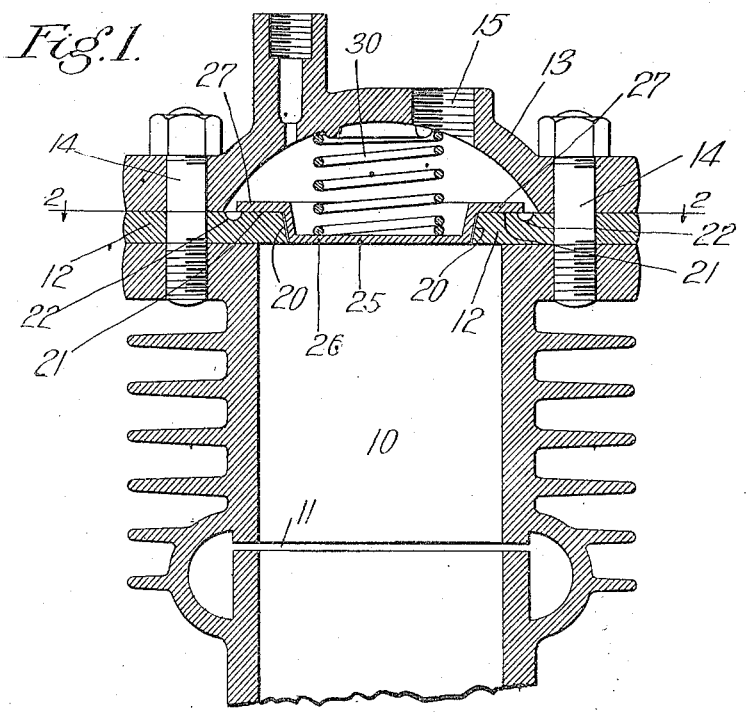
Figure 2:
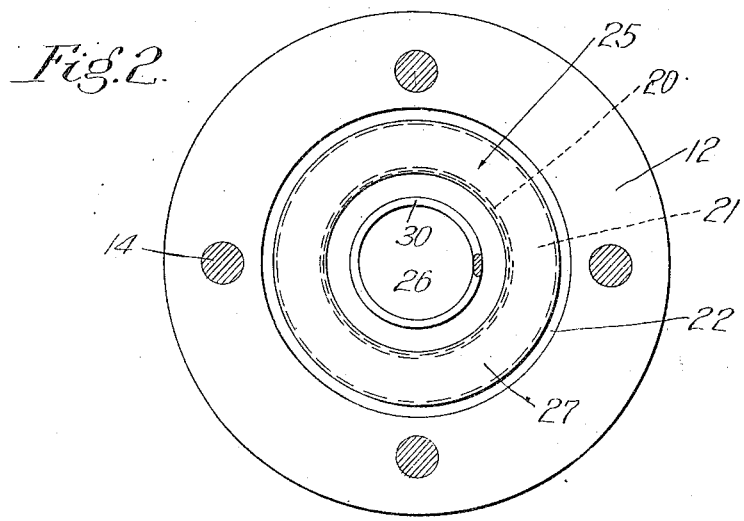

Figure 1 is a vertical section showing my valve as applied to an air compressor or the like, and Fig. 2 is a section taken as indicated by line 2—2 on Fig. 1.

In the drawings the numeral 10 designates the cylinder of an air compressor having an inlet port 11 at some suitable point below its upper end. Immediately on top this cylinder I mount the valve seat plate 12, and over the valve seat plate there is a cap 13 as shown in Fig. 1. The three parts mentioned are held together by suitable bolts 14. The outlet is provided at 15.

The valve seat plate 12 has a conical opening 20 therethrough; in the present construction the angle made by the wall of this conical opening with a vertical line is ten degrees; but this angle may be made larger or smaller as desired, depending upon the amount of opening desired in the valve, etc.

On the upper face of the valve plate I provide a preferably flat annular valve seat 21 surrounded by an annular groove 22. In the present construction the plate 12 is made out of cast iron, it being found that, with my improved type of valve, a cast iron seat is sufficient to withstand the small amount of wear to which the seat is subjected.

The valve 25 is dish shaped and consists of a body portion 26 and an annular preferably flat flange 27 projecting from the upper edge of the body portion as is clearly shown in Fig. 1. This flange 27 seats upon the valve seat 21, while the body portion 26 fits more or less loosely in the conical opening 20. Broadly, it is of no consequence whether the body fits tightly or loosely in the conical opening when the valve is first made, providing that the flange 27 can fit down tightly upon the seat 21. If the valve were so made that the body should fit tightly in the opening when the flange is accurately seated, which is practically impossible, the body would soon wear to a certain looseness of fit in the opening 20.

The body 26 is hollow, as hereinbefore mentioned, and it will be noted that the whole valve is of substantially the same thickness throughout, and that this thickness is comparatively small, so that the whole valve is of relatively small mass. The body portion 26 plays no part so far as the actual valve action is concerned; that is, no part so far as forming a tight joint is concerned; but the body performs certain important functions, as follows: The body 26 completely fills the opening 20, the transverse dimension of the body being equal to the thickness of the plate 12; so that, when the valve is in the position shown, there is no clearance whatever within the valve opening 20. And, when the piston of the compressor is adjusted so that its upward stroke takes it to the under face of the plate 12, there is no clearance whatever in the compressor except the small amount caused by the raising of the valve when discharging. The primary function of the body 26 is to be a guide for the valve. The body 26 fits loosely in the opening 20, as hereinbefore stated, and guides the flat flange 27 properly onto its seat 21. It will be noted that the body fits conically in the opening; and that, although the conical shape provides for a proper annular opening around the body when the valve is lifted, the valve is always accurately centered when seated. The valve is so proportioned that it never lifts so far as to carry the body 26 out of the opening 20. The cap 13 is so designed that the flange 27 would strike the cap before the body of the valve lifts completely out of the opening 20; but, in actual practice, the valve never raises so far that the flange strikes the cap 13. A coiled or other spring 30 seats in the hollow of the body portion of the valve and presses downwardly on the valve so as to force it toward its seat; but in practice other suitable means may be employed or the spring may be dispensed with entirely. The body also performs the function of stiffening the flange and holding it in shape.

In making the valve 25, the body and flange are first formed of a suitable metal, preferably vanadium steel, and the valve is then treated to about 1,000 degrees F. and then afterward ground accurately. After being ground, the flange 27 seats very accurately and tightly upon the seat 21, the spring pressure and the back pressure behind the valve forcing the flange tightly onto the seat. The thickness of the flange assists greatly in this action, allowing the flange to follow any minute irregularities in the seat 21. This close and intimate fitting of the flange with the valve seat allows the valve to be effectively "oil packed"; that is, the small amount of oil which finds its way to a valve from the lubrication of the piston in the cylinder 10 forms a film on the seat and on the flange 27 and materially assists in forming a completely air-tight and pressure tight joint. Another feature which I have mentioned and which I wish to particularly emphasize is that the lightness of the valve almost completely obviates any pounding of the valve on the seat and thus obviates wear on the valve and seat. In fact, my valve is so accurate and tight fitting that it will hold pressure throughout long periods, whereas the valves usually used for such purposes, such as check valves, compressor valves, etc., will not ordinarily hold pressure during any long period.

Having described a preferred form of my invention, I claim:

The combination with a seat plate having a conical opening therethrough and a flat annular valve seat surrounding the opening at its larger end, of a valve comprising a frusto-conical body having the same taper as the conical opening and of slightly less diameter than the opening, the body being of a depth substantially equal to the thickness of the seat plate so that the body will closely fit the whole of the conical opening, and a flat annular flange of substantial area surrounding the larger end of the body and constituting the sole seating surface for the valve, said annular flange adapted to seat on said annular valve seat and having sufficient flexibility to be conformable truly to its seat under the variations of temperature to which the valve is subjected, the body portion of the valve being hollow with a thin wall of uniform dimensions, said valve being free to adapt itself to its seat and guided solely through engagement of said frusto-conical body with said conical opening.

In witness that I claim the foregoing I have hereunto subscribed my name this 3rd day of April 1915.

FRANK A. HATFIELD.

Witnesses:
F. C. KINGSTON,
EDWARD H. BARKELEW.

Copies of this patent may be obtained for five cents each, by addressing the "Commissioner of Patents, Washington, D. C."